Feb. 1, 1938.   O. R. BRINEY   2,107,051
BUSHING LOCATING AND ROTATING MEANS
Original Filed April 13, 1927

Inventor
O. R. Briney
By
C. F. Heinkel,
Attorney

Patented Feb. 1, 1938

2,107,051

UNITED STATES PATENT OFFICE 2,107,051

BUSHING LOCATING AND ROTATING MEANS

Ottis R. Briney, Pontiac, Mich.

Original application April 13, 1927, Serial No. 183,629. Divided and application September 6, 1935, Serial No. 39,436. Divided and this application April 15, 1936, Serial No. 74,589

7 Claims. (Cl. 51—103)

The present invention relates to machining of bushings.

The present application is divided out of the applicant's prior application, Serial No. 39,436 filed September 6, 1935 which had been divided out of the applicant's prior application, Serial No. 183,629, filed April 13, 1927, now Patent No. 2,059,723, dated Nov. 3, 1936.

In the prior art, bushings are machined by different means and methods all of which, however, have the difficulties and disadvantages of inaccuracy and inconvenience in manufacture and inecomony of manufacture and not being true after machining in that the surface of the bore of bushings is not concentric with the outer surface thereof, or the wall of the bushing is not of even thickness all around with the result that such a bushing, being driven into a hole which is bored correctly for locating a bushing to guide a tool to bore a hole at a certain location, will not bring the hole in the bushing to the certain location since the bore of the bushing is eccentric with the outer wall thereof. This is a serious disadvantage and can not be tolerated in accurate work as is required in present day manufacture.

Furthermore, a bushing of which the evenness or unevenness of the wall thereof is not known, either the bushing must undergo a special inspection and test as to the thickness of the wall thereof before it can be put into a jig or other tool guiding device with any sort of assurance that the bushing will guide a tool to bore a hole where it is wanted to be bored.

When the accuracy of a bushing is not known and the bushing is driven into a tool guiding device, a location test must be made to ascertain whether or not the hole in the bushing will guide a tool to the precise location where the tool is to bore a hole. Such a test usually results in the bushing having to be driven out of the device and substituted by a new one or the old one corrected to eventually locate the bushing so that it will guide a tool to its desired position relative to work. This cut and try method is expensive and time consuming and is a serious disadvantage.

The present application and invention therein aims to provide means whereby the former disadvantages are eliminated by machining the bushing so that the wall of the bore is concentric with the outside wall of the bushing and the wall of the bushing is of even thickness all around so that no special inspection is necessary in this respect and the bushing can be driven into a correctly bored hole with the assurance that the hole in the bushing will guide a tool to bore a hole where it is wanted to be bored. In addition to eliminating the disadvantages of the prior art, the present invention reduces cost of production of bushings and cost of installation thereof.

Objects of the present invention are:

To provide a means for economical and convenient and efficient machining of bushings accurately.

To provide a means which uses sidewise spaced rollers, each movable relative to the other and both co-operating by movement thereof to locate a bushing for correct machining thereof; the rollers being rotated to rotate the bushing against an abutment in addition to the rollers locating the bushing for machining thereof.

Other objects will be pointed out in this specification during the description of the device shown in the accompanying drawing or will become obvious or apparent or will suggest themselves upon inspection of this specification and the accompanying drawing which forms part of this specification.

In the accompanying drawing.

Similar reference characters refer to similar parts in both of the views.

Figure 1:
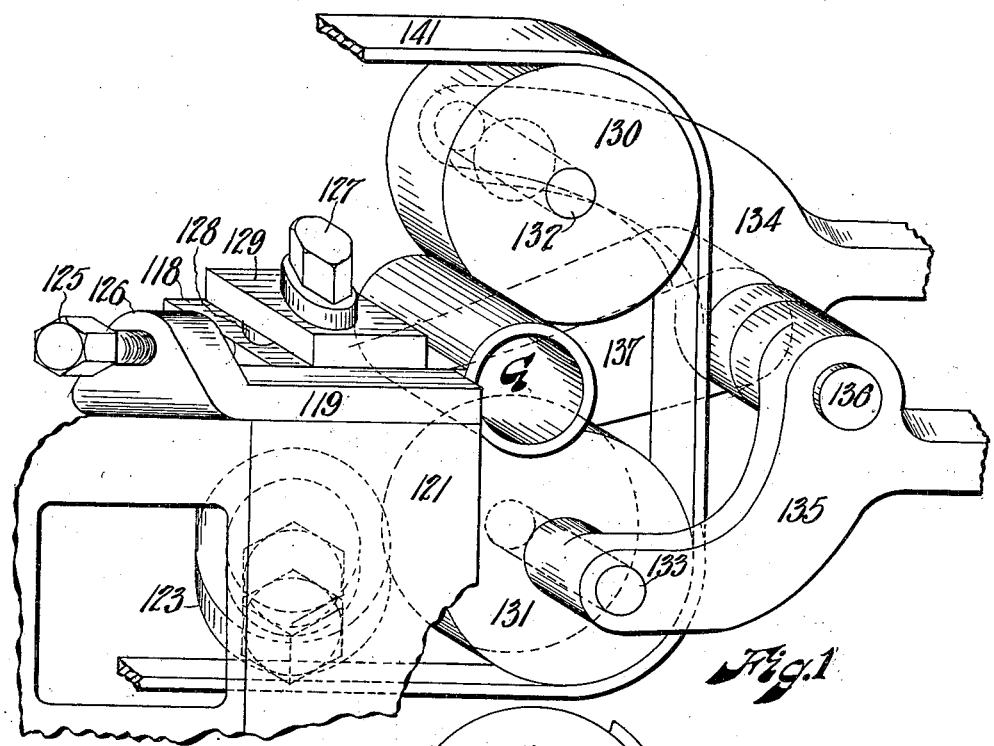
Fig. 1 is a perspective view of a device embodying the present invention.
Figure 2:
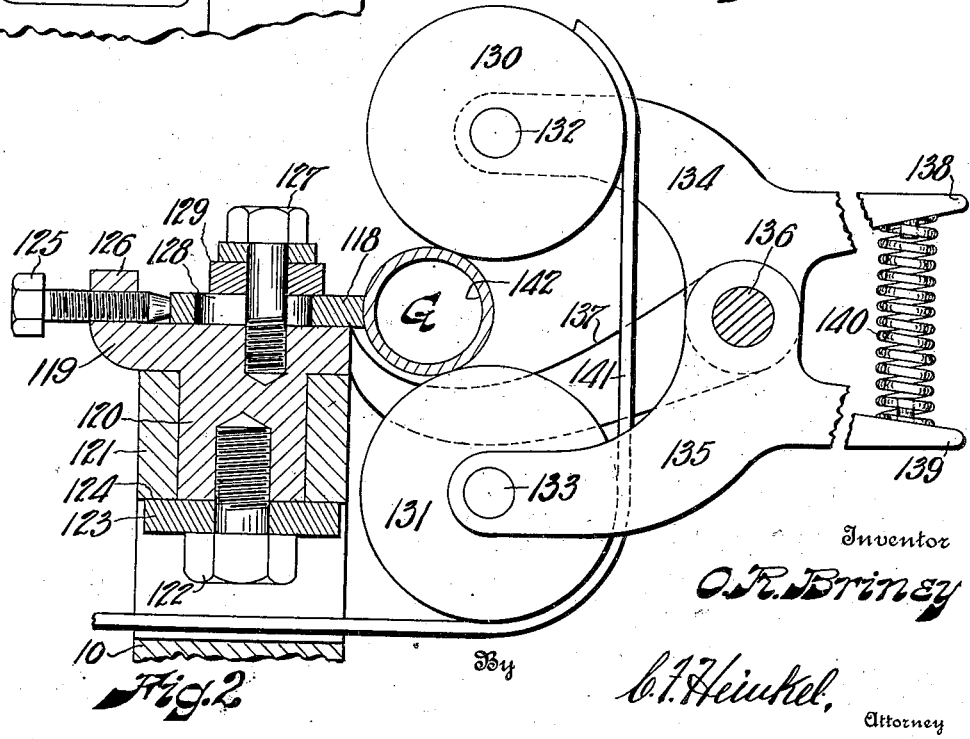
Fig. 2 is a section through the middle of Fig. 1 to show relations of parts more clearly.

The base 10 may be made of any suitable material or form and may be an individual unit or of a form to fit another machine and has the tubular boss 121 thereon.

The block 119 has the diametrically round shank 120 fitting into the tubular boss and being rotatable therein for adjustably relating the parts on the top of the block 119 to the sides of bushings G. The washer 123 is held against the face 124 of the boss 121 by the screw 122 tapped into the part 120 and the head thereof abutting the washer 123 to clamp the block 119 onto the tubular boss 121 to prevent rotation of the block in the boss when the former is adjusted relative to the boss.

The bushing abutment member 118 rests on the top of the block 119 and is movable thereon so that the same can be moved toward and away from bushings for machining differently sized bushings. The abutment member 118 is also movable on the top of the block 119 in a circular direction, in addition to the rotatability of the block, to afford a convenient means to adapt the device for angularly relating bushings to the device for such purposes as machining a taper hole therein or for relating bushings with outer surfaces which are tapered to bore a cylindrical straight hole therethrough. The slot 128 through the abutment member 118 affords a means for moving the same on the top of the block 119 and the screw 127, tapped into the block 119, clamps the abutment member in adjusted position through the washer 129.

The screw 125 is threaded into the ear 126 extending upwardly from the block 119 and the inner end thereof abuts the abutment member 118 to move the same inwardly and to assist the screw 127 in keeping the same from backing up during the use of the device.

The pivot pin 136 is mounted in the arm 137 extending from the block 119 and may be journaled therein or held against rotation therein.

The arms 134 and 135 are each preferably journaled on the pin 136 when the pin is held against rotation. The arms are adjacent to each other on the pin and the pin passes through the arms intermediate the ends thereof.

The spring 140 is mounted between the ends 138 and 139 of the arms 134 and 135 and normally tends to spread these outer ends apart.

The roller 130, preferably, is journaled on the pin 132 mounted in the inner end of the arm 134 and the roller 131, preferably, is journaled in the inner end of the arm 135.

The belt 141 contacts both of the rollers to rotate the same.

To place a bushing to be bored into the device, the ends 138 and 139 are pressed toward each other against the action of the spring 140 which operation moves the rollers away from each other and lets a bushing be placed between the same. Upon release of the ends 138 and 139, the spring moves these ends away from each other and by that action moves the rollers toward each other. This roller action causes the rollers to engage the bushing and move the same into a centralizing position and against the abutment member 118. The one spring 140, acting on both of the arms, tends to keep the bushing centralized.

When a taper bushing is to be bored, either the abutment member 118 or the block 119 is adjusted to suit the taper of the bushing when a straight cylindrical hole is to be machined therethrough or may be adjusted so that a tapered hole may be bored. This swivable adjusting of the abutment member and/or of the block 119 affords a convenient means for locating and holding a bushing to bore any kind of a hole therethrough and in any case the bore will be exactly concentric with the outer surface and the wall will be of even thickness all around since the bushing will be guided by the outer surface thereof in all cases while the hole thereof is being bored. There is no possibility of error on the part of a workman.

The arm 137 being a part of the block 119 rotates with the block so that the rollers also attain an angular position relative to the bushing.

The additional swivability of the abutment member is used when swivelling of the block 119 alone will not produce the desired contact of the rollers on the bushing.

The device shown and described is simple and economical of structure, easy of operation, easy to receive and discharge bushings and holds bushings for machining thereof in such a manner that the hole in the bushings is concentric with the outside thereof and the wall of the bushing is of even thickness all around.

I am aware that changes and modifications can be made in the structure and relations and arrangements of elements from that shown and described within the spirit and intent and scope of the present invention and the appended claims. Therefore without limiting myself to the precise structure and relations and arrangements of elements as shown and described,

I claim:

1. In a bushing locating and rotating means, a base including a bushing abutment member, an arm projecting from said base, a pin mounted in said arm, two pivotally movable arms, each to pivot relative to the other, a bushing abutment roller rotatable on the inner end of each of said pivotable arms, and a belt contacting both of said rollers to rotate the same and thereby rotate the bushing and localize the same against said abutment member.

2. A base, an abutment member on said base to abut a side of a bushing, a pair of arms each mounted to pivot on said base, a roller journaled in each of said arms, means for simultaneously pivoting both of said arms and thereby moving said rollers positionally for locating and alining the bushing on said abutment member, and a belt contacting both of said rollers for rotating said rollers to rotate the bushing against said abutment member for machining of the bushing.

3. A base, an abutment member fixed to said bed to abut a side of a bushing, a pair of arms each mounted to pivot on said bed on an axis intermediate the ends of the arms, a roller journaled in one end of each of said arms, a spring between the other ends of said arms to move said rollers oppositely for moving the bushing against said abutment member, and means for rotating said rollers to rotate the bushing against said abutment member for machining of the bushing.

4. A base, a block rotatably adjustable in said base for taper bushings, an abutment member mounted on said block to abut a side of a bushing, rollers carried by said block to contact the bushing and locate and aline the same on said abutment member, and means for rotating said rollers to rotate the bushing against said abutment member for machining on the bushing.

5. A base, a block rotatably adjustable in said base, an abutment member mounted on said block to abut a side of a bushing and being adjustable thereon relative thereto for different diameters of bushings, a pair of rotatable rollers relatively movable to move and aline and locate the bushing against said abutment member, and means for rotating said rollers to rotate the bushing against said abutment member for machining of the bushing.

6. In a bushing machining device, a base, a block rotatably adjustable in said base, an abutment member on said block and being adjustable thereon rotatively as well as toward and away from bushings in the device for machining different sizes of bushings and, together with the rotatable adjustability of said block provides a means for locating and rotating taper bushings, a pair of rotatable rollers movable relatively to aline and locate and rotate a bushing against said abutment member for machining on the bushing, means for positionally moving said rollers, and means for rotating said rollers to rotate the bushing for machining thereof.

7. A base, a bushing abutment member adjustable relative to said base, a pair of relatively movable arms each pivotally mounted on said base and each pivotably relative to the other, the axis of pivot of said arms being located intermediate the ends thereof, a rotatable roller on one of the ends of each of said arms to contact and locate and aline the bushing for machining thereof, a spring between the other ends of both of said arms to keep said rollers in contact on the bushing, and means for rotating said rollers to rotate the bushing for machining thereof.

OTTIS R. BRINEY.